United States Patent
Liang

(10) Patent No.: US 12,367,077 B2
(45) Date of Patent: Jul. 22, 2025

(54) OPTIMIZATION METHOD FOR LARGE-SCALE CLOUD SERVICE PROCESSES

(71) Applicant: SOOCHOW UNIVERSITY, Suzhou (CN)

(72) Inventor: Helan Liang, Suzhou (CN)

(73) Assignee: SOOCHOW UNIVERSITY, Suzhou (CN)

( * ) Notice: Subject to any disclaimer, the term of this patent is extended or adjusted under 35 U.S.C. 154(b) by 541 days.

(21) Appl. No.: 17/784,858

(22) PCT Filed: Apr. 30, 2021

(86) PCT No.: PCT/CN2021/091371
§ 371 (c)(1),
(2) Date: Jun. 13, 2022

(87) PCT Pub. No.: WO2022/198754
PCT Pub. Date: Sep. 29, 2022

(65) Prior Publication Data
US 2023/0316187 A1    Oct. 5, 2023

(30) Foreign Application Priority Data
Mar. 24, 2021  (CN) .......................... 202110314985.5

(51) Int. Cl.
*G06F 9/50*     (2006.01)
*G06F 9/48*     (2006.01)

(52) U.S. Cl.
CPC .......... *G06F 9/5072* (2013.01); *G06F 9/4881* (2013.01); *G06F 9/5038* (2013.01)

(58) Field of Classification Search
CPC ..... G06F 9/4881; G06F 9/5038; G06F 9/5072
(Continued)

(56) References Cited

U.S. PATENT DOCUMENTS

2018/0052718 A1*  2/2018  Demulder ................. G06F 9/52

FOREIGN PATENT DOCUMENTS

CN    103019822 A    4/2013
CN    105897864 A    8/2016
(Continued)

OTHER PUBLICATIONS

Ghetas, Mohamed. "A multi-objective Monarch Butterfly Algorithm for virtual machine placement in cloud computing." Neural Computing and Applications 33.17 (2021): 11011-11025. (Year: 2021).*

(Continued)

*Primary Examiner* — April Y Blair
*Assistant Examiner* — Justin Che-Chun Tong
(74) *Attorney, Agent, or Firm* — SZDC Law PC

(57) ABSTRACT

The invention relates to an optimization method for large-scale cloud service processes, including: randomly allocating a plurality of execution plans to a plurality of parallel nodes; performing, by each parallel node, a local iteration in parallel to process the execution plans inside the parallel node until the local iteration stops, where during each local iteration, the parallel node needs to process the execution plans by using DMBO algorithm and a dependency-conflict repair algorithm; then gathering together execution plans obtained after the local iterations in all the parallel nodes are completed; and determining whether a global iteration stop condition is satisfied, where if yes, optimal execution plans are directly outputted, or otherwise, the gathered execution plans are reallocated to the plurality of parallel nodes, and then the foregoing steps are repeated. The present invention improves the efficiency and accuracy of solution seeking of the optimization method for cloud service processes.

7 Claims, 6 Drawing Sheets

(58) Field of Classification Search
USPC .......................................... 718/102, 103, 104
See application file for complete search history.

(56) References Cited

FOREIGN PATENT DOCUMENTS

| | | |
|---|---|---|
| CN | 106055395 A | 10/2016 |
| CN | 110688224 A | 1/2020 |
| CN | 112398899 A | 2/2021 |
| WO | 2019196127 A1 | 10/2019 |
| WO | 2019203822 A1 | 10/2019 |

OTHER PUBLICATIONS

Feng, Yanhong, et al. "Monarch butterfly optimization: a comprehensive review." Expert Systems with Applications 168 (2021): 114418. (Year: 2021).*
Wang, GG., Hao, GS., Cheng, S., Qin, Q. (2016). A Discrete Monarch Butterfly Optimization for Chinese TSP Problem. In: Tan, Y., Shi, Y., Niu, B. (eds) Advances in Swarm Intelligence. ICSI 2016. Lecture Notes in Computer Science(), vol. 9712. Springer, Cham. https://doi.org/10.1007/978-3-319-41000-5_16 (Year: 2016).*
Strumberger, Ivana, et al. "Cloudlet scheduling by hybridized monarch butterfly optimization algorithm." Journal of Sensor and Actuator Networks 8.3 (2019): 44. (Year: 2019).*
Gomathi, B., et al. "Monarch Butterfly Optimization for Reliable Scheduling in Cloud." Computers, Materials & Continua 69.3 (2021). (Year: 2021).*

\* cited by examiner

OPTIMIZATION METHOD FOR LARGE-SCALE CLOUD SERVICE PROCESSES

This application is the National Stage Application of PCT/CN2021/091371, filed on Apr. 30, 2021, which claims priority to Chinese Patent Application No. 202110314985.5, filed on Mar. 24, 2021, which is incorporated by reference for all purposes as if fully set forth herein.

FIELD OF THE INVENTION

The present invention relates to the field of cloud service technologies, and in particular, an optimization method for large-scale cloud service processes.

DESCRIPTION OF THE RELATED ART

A service process is a collection of logically related business activities built by an enterprise based on web services (referred to as services for short), workflows, and other technologies to achieve specific management goals. With the rapid development of cloud computing, it has become a major trend to build service processes through cloud services. This approach can quickly improve the flexibility, economy, and integration of service process management.

As enterprise processes become increasingly complex and the number of services grows explosively, it becomes an important and challenging problem to find an optimal execution solution for large-scale cloud service processes. Most algorithms used in existing optimization problems for cloud service processes are serial optimization methods, for example, methods based on the improved Whale Optimization Algorithm (Eagle Strategy with Whale Optimization Algorithm, ESWOA) and multi-population parallel self-adaptive differential artificial bee colony (MPsaDABC) Algorithm. In such algorithms, optimization strategies are designed by simulating processes such as foraging of whales and pollen collection of honey bees, and iterative optimization is performed to search for optimal execution plans for cloud service processes. Serial optimization methods are used in all these algorithms, and the performance of the methods deteriorates rapidly as the scale of a problem increases, making it difficult to apply such methods to optimization problems for large-scale cloud service processes. Due to business requirements and customer preferences, there are often various quality of service (QoS) constraints (such as deadline and cost constraints) and dependency and conflict constraints between services. However, the above algorithms cannot effectively support the above service constraints, which may lead to infeasible execution plans.

To resolve difficulties caused by the increasing complexity of cloud service processes and the explosive growth of cloud services, parallel optimization research for large-scale cloud service processes has attracted more and more attention. However, parallel solution seeking algorithms proposed in existing parallel optimization methods for large-scale cloud service processes are all implemented based on single-computer (for example, multi-threads or multi-cores) or non-memory programming models (for example, Hadoop MapReduce). A single-computer parallel model depends on the performance of individual hardware and has poor scalability. The non-memory programming model requires frequent data exchange with a storage medium and lacks high computational efficiency. Therefore, the scalability and solution seeking efficiency of the existing parallel optimization methods for large-scale cloud service processes need to be further improved. The algorithms are only applicable to simple optimization problems for large-scale cloud service processes with a single service process structure and a single QoS constraint, and it is difficult to use such algorithms to accurately evaluate the feasibility of plans with different process structures, QoS constraints, and service correlation constraints and other complex constraints and obtain optimal solutions.

In summary, existing optimization methods for cloud service processes have low efficiency and accuracy of solution seeking and are not applicable to solution seeking of optimization for large-scale cloud service processes with different service process structures, QoS constraints, and service correlation constraints.

SUMMARY OF THE INVENTION

For this, a technical problem to be resolved by the present invention is to overcome the problem in the prior art that existing optimization methods for cloud service processes have low efficiency and accuracy of solution seeking and are not applicable to solution seeking of optimization for large-scale cloud service processes with different service process structures, QoS constraints, and service correlation constraints.

To resolve the foregoing technical problems, the present invention provides an optimization method for large-scale cloud service processes, including the following steps:

S1) randomly allocating a plurality of execution plans to a plurality of parallel nodes, to allow each parallel node to be allocated with a plurality of execution plans;

S2) performing, by each parallel node, a local iteration in parallel to process the execution plans inside the parallel node, where during each local iteration, the parallel node first processes the execution plans inside the parallel node by using a discrete monarch butterfly optimization (DMBO) algorithm to obtain new execution plans, then repairs the new execution plans by using a dependency-conflict repair algorithm to obtain repaired execution plans, then evaluates the repaired execution plans by using a utility function, and filters the repaired execution plans according to evaluation results;

S3) gathering together execution plans obtained after the local iterations in all the parallel nodes are completed;

S4) determining whether a global iteration stop condition is satisfied, where if yes, the execution plans obtained in step S3) are final optimal execution plans, and the optimal execution plans are directly outputted, or if not, step S5) is performed; and S5) reallocating the gathered execution plans obtained in step S3) to the plurality of parallel nodes, and then performing steps S2) to S4) again.

In an embodiment of the present invention, a method for processing the execution plans inside the parallel node by using a DMBO algorithm to obtain new execution plans in step S2) includes:

dividing the plurality of execution plans inside the parallel node into two parts, defining one part as a first subgroup, and defining the other part as a second subgroup; and processing the first subgroup by using a migration operator to obtain a set of one part of the new execution plans, and processing the second subgroup by using an adjustment operator to obtain a set of the other part of the new execution plans.

In an embodiment of the present invention, each execution plan includes a plurality of tasks, and when the first subgroup is processed by using the migration operator to obtain the set of one part of the new execution plans, a candidate service to be allocated to each task in each new execution plan in the part is determined in the following manner: randomly selecting two execution plans from the first subgroup as first reference plans, and selecting one candidate service from candidate services corresponding to the same task in the two first reference plans as the candidate service to be allocated to the task in the new execution plan.

In an embodiment of the present invention, each execution plan includes a plurality of tasks, and when the second subgroup is processed by using the adjustment operator to obtain the set of the other part of the new execution plans, each new execution plan in the part is determined in the following manner:

selecting a current optimal execution plan from all execution plans inside the parallel node, and randomly selecting one execution plan from the second subgroup as a second reference plan; and setting a primary assessment probability and a secondary assessment probability, defining a probability randomly generated based on a uniform distribution principle as a reference probability, and calculating the reference probability, where if the reference probability is not greater than the primary assessment probability, one candidate service is selected from candidate services corresponding to the same task in the current optimal execution plan as the candidate service to be allocated to the task in the new execution plan; if the reference probability is greater than the primary assessment probability and less than the secondary assessment probability, one candidate service is selected from candidate services corresponding to the same task in the second reference plan as the candidate service to be allocated to the task in the new execution plan; or if the reference probability is greater than or equal to the secondary assessment probability, one candidate service is randomly selected from all candidate services of a corresponding task as the candidate service to be allocated to the task in the new execution plan.

In an embodiment of the present invention, the current optimal execution plan is an execution plan with the highest utility value in all the execution plans inside the parallel node.

In an embodiment of the present invention, a calculation formula of the utility value is as follows:

$$\text{Utility}(X') = \begin{cases} Q(X') + 1, & \text{if } \prod_{u=1}^{|N_{QCS}|} sq_u = 1 \\ \prod_{u=1}^{|N_{QCS}|} sq_u, & \text{otherwise} \end{cases},$$

where $$sq_u = \begin{cases} \min\{1, Q_p(X'_{sub})_u / d_u\}, & \text{if } p \in AC \\ \min\{1, d_u / Q_p(X'_{sub})_u\}, & \text{otherwise} \end{cases} \forall u = 1, \ldots, |N_{QCS}|,$$

Utility (X') denotes a utility value of an execution plan X', Q(X') is an aggregated QoS value of the execution plan X', $sq_u$ denotes a degree of satisfaction of a $u^{th}$ QoS constraint, $N_{QCS}$, denotes the number of QoS constraints, $Q_p(X'_{sub})_u$ denotes an aggregated QoS value of services of a local execution plan of a $p^{th}$ attribute in the $u^{th}$ QoS constraint, $X'_{sub}$ denotes the local execution plan, AC denotes a set of ascending attributes, and $d_u$ denotes a boundary value of the $u^{th}$ QoS constraint.

In an embodiment of the present invention, a service correlation constraint includes a service dependency constraint and a service conflict constraint;

a service with the service correlation constraint is categorized into a pre-service and a post-service;

the service dependency constraint is defined as follows: if the post-service can be selected only after the pre-service is selected, the service dependency constraint exists between the pre-service and the post-service;

the service conflict constraint is defined as follows: if the post-service and the pre-service can only be selected alternatively, the service conflict constraint exists between the pre-service and the post-service; and a method for repairing the obtained new execution plans by using a dependency-conflict repair algorithm to obtain repaired execution plans in step S2) includes the following step:

examining service correlation constraints involved in the new execution plans one by one, where during each examination, it is first determined whether the service correlation constraint is valid, and if yes, a pre-service in the service correlation constraint is added with a "mandatory" label to a dependency-conflict table to represent that the pre-service must exist in an execution plan, and a next examination is performed, or if not, a current execution plan is repaired to make the repaired execution plan both satisfy a requirement of a dependency-conflict table and obey the service correlation constraint.

In an embodiment of the present invention, during each examination, if the service correlation constraint in the current examination is invalid, the current execution plan is repaired by using the following method: first repairing the current execution plan by using a local replacement method, and if the current execution plan fails to be repaired by using the local replacement method, formulating a new execution plan to globally replace the current execution plan.

In an embodiment of the present invention, a service allocated in a task belonging to a pre-service in the current execution plan is defined as a first to-be-determined service, and a service allocated in a task belonging to a post-service in the current execution plan is defined as a second to-be-determined service, where if the service correlation constraint is a service dependency constraint, and a post-service in the service dependency constraint has been allocated in the current execution plan, but the first to-be-determined service is different from a pre-service in the service dependency constraint, a method for repairing the current execution plan by using a local replacement method includes: first querying whether the first to-be-determined service exists in the dependency-conflict table with the "mandatory" label, and if yes, randomly selecting, from other candidate services of the task belonging to the post-service, one candidate service without a correlation constraint to replace the post-service, and adding the post-service to the dependency-conflict table with a "forbid" label, or if not, replacing the first to-be-determined service with the pre-service;

if the service correlation constraint is a service dependency constraint, and a pre-service in the service dependency constraint has been allocated in the current execution plan, but the second to-be-determined service is different from a post-service in the service dependency constraint, a method for repairing the current execution plan by using a local replacement method includes: first querying whether the second to-be-determined service exists in the dependency-conflict table with the "mandatory" label, and if yes, randomly selecting, from other candidate services of the task belonging to the pre-service, one candidate service with a correlation constraint to replace the pre-service, and adding the pre-service to the dependency-conflict table with a "forbid" label, or if not, replacing the second to-be-determined service with the post-service; and if the service correlation constraint is a service conflict constraint, a post-service in the service conflict constraint has been allocated in the current execution plan, and the first to-be-determined service is the same as a pre-service in the service conflict constraint, a method for repairing the current execution plan by using a local replacement method includes: first querying whether the first to-be-determined service exists in the dependency-conflict table with the "mandatory" label, and if yes, randomly selecting, from other candidate services of the task belonging to the post-service, one candidate service without a correlation constraint to replace the post-service, and adding the post-service to the dependency-conflict table with a "forbid" label, or if not, randomly selecting, from other candidate services of the task belonging to the pre-service, one candidate service without a correlation constraint to replace the pre-service, and adding the pre-service to the dependency-conflict table with a "forbid" label.

Compared with the prior art, the foregoing technical solution of the present invention has the following advantages:

The optimization method for large-scale cloud service processes in this embodiment of the present invention greatly improves the efficiency and accuracy of solution seeking of the optimization method for cloud service processes and can be effectively applied to optimization problems for large-scale cloud service processes with different service process structures, QoS constraints, and service correlation constraints.

BRIEF DESCRIPTION OF THE DRAWINGS

To make the content of the present invention clearer and more comprehensible, the present invention is further described in detail below according to specific embodiments of the present invention and the accompanying draws. Where.

DETAILED DESCRIPTION OF THE PREFERRED EMBODIMENTS

The present invention is further described below with reference to the accompanying drawings and specific embodiments, to enable a person skilled in the art to better understand and implement the present invention. However, the embodiments are not used to limit the present invention.

Figure 1:
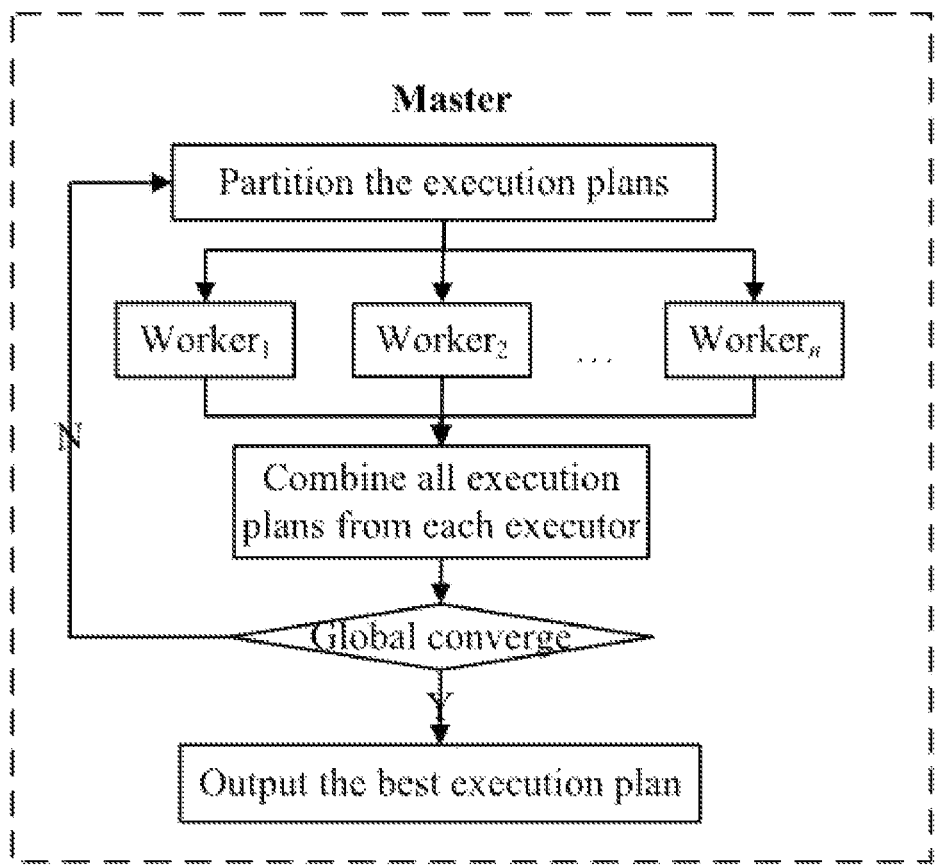
FIG. 1 is a structural block diagram of an optimization method for large-scale cloud service processes according to the present invention.
Figure 2:
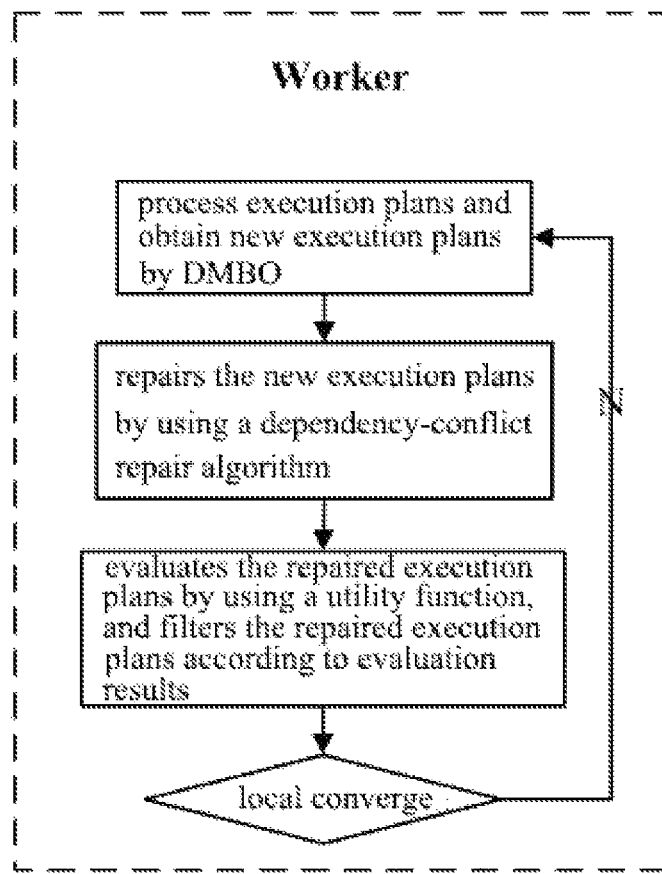
FIG. 2 is a block diagram of running inside parallel nodes in FIG. 1.

Referring to FIG. 1 and FIG. 2, this embodiment discloses an optimization method for large-scale cloud service processes, including the following steps:

S1) Randomly allocate a plurality of execution plans to a plurality of parallel nodes, to allow each parallel node to be allocated with a plurality of execution plans, thereby implementing parallel execution of operations and increasing the processing speed.

The execution plans in this stage are initial plans. In this case, each execution plan is generated in a manner of randomly allocating a service to each task. The execution plan may be randomly generated according to parameters such as an abstract service process and a candidate cloud service. The plurality of generated execution plans are allocated to the plurality of parallel nodes.

S2) Perform, by each parallel node, a local iteration in parallel to process the execution plans inside the parallel node.

During each local iteration, the parallel node first processes the execution plans inside the parallel node by using a DMBO algorithm to obtain new execution plans, then repairs the new execution plans by using a dependency-conflict repair algorithm to obtain repaired execution plans, then evaluates the repaired execution plans by using a utility function, and filters the repaired execution plans according to evaluation results.

The utility function is a utility function that supports QoS aggregation and satisfies a QoS constraint.

Services of each task in the DMBO algorithm are independently allocated. Therefore, it cannot be ensured that a generated execution plan satisfies a service correlation constraint, for example, dependency and conflict constraints between services. To satisfy the service correlation constraint, the dependency-conflict repair algorithm is proposed to perform repair. A pre-service or a post-service is modified to repair an execution plan, to make the execution plan feasible and prevent the execution plan from causing a constraint conflict.

S3) Gather together execution plans obtained after the local iterations in all the parallel nodes are completed. It may be understood that an execution plan obtained through filtering after the local iterations in all the parallel nodes is a current optimal execution plan.

S4) Determine whether a global iteration stop condition is satisfied, where if yes, the execution plans obtained in step S3) are final optimal execution plans, and the optimal execution plans are directly outputted, or if not, step S5) is performed.

S5) Reallocate the gathered execution plans obtained in step S3) to the plurality of parallel nodes, and then perform steps S2) to S4) again.

It may be understood that each execution plan includes a plurality of tasks. The execution plans are all plans formulated to implement one same service process. Different execution plans have the same task type and task sequence, are only are different in services allocated to tasks. That is, a different service is selected for at least one task. For example, each execution plan may be encoded into one integer sequence EP=$\{x_{11}, x_{12}, \ldots, x_{ij} \ldots x_{nm}\}$. $x_{ij}$ denotes a service selected for a task $t_{ij}$. For example, the task $t_{11}$ has 4670 candidate services. Therefore, a value range of the first position $x_{11}$ is 1 to 4670. Because each task may match a different service, service process optimization is to find an execution plan with the highest utility value.

In the optimization method for large-scale cloud service processes, a plurality of parallel nodes are used. A plurality of local iterations are performed inside each parallel node. The number of local iterations may be set according to a corresponding requirement. For example, in consideration of that the number of populations of each parallel worker node is less than the number of populations of a master node, local convergence tends to occur. To resolve this problem, one composite local iteration stop condition that comprehensively takes a maximum number of unimproved iterations and a maximum number of local iterations into consideration may be set. When the number of iterations of the parallel node is greater than the set maximum number of local iterations or the number of times that an optimal solution of the parallel node is unimproved is greater than the maximum number of unimproved iterations, the local iteration stops. The execution plans of each parallel worker node are gathered at the master node and are randomly divided again in the master node to guide a next round of search. A global iteration stop condition of the master node may be determined according to a set global maximum number of iterations, and the cycle stops after the global maximum number of iterations is reached.

In a conventional optimization algorithm for cloud service processes, each parallel node only generates one generation of execution plans, and the execution plans are collected at the master node for a next iteration. To reduce communication overheads between the parallel nodes and the master mode, a local iteration-based coarse-granularity parallel model is proposed. In each global iteration, execution plans are divided into a plurality of partitions for generating new execution plans at each parallel worker node in parallel. In addition, each parallel worker node performs a plurality of iterations, and then the process returns to the master node until the local iteration stop condition is satisfied. For each iteration, the DMBO algorithm is first run to search for a group of new execution plans, and the new execution plans are repaired to satisfy a service correlation constraint. Next, a utility function that supports QoS aggregation and satisfies QoS constraints is calculated, to obtain a subpopulation. The foregoing method can ensure that an optimal executable plan is obtained.

In an embodiment, a method for processing the execution plans inside the parallel node by using a DMBO algorithm to obtain new execution plans in step S2) includes the following steps.

The plurality of execution plans inside the parallel node are divided into two parts, one part is defined as a first subgroup, and the remaining part is defined as a second subgroup. Specifically, the plurality of execution plans inside the parallel node are sorted in descending order of utility values of the execution plans. The execution plans arranged in the first half part are defined as the first subgroup, and the remaining part is defined as the second subgroup.

The first subgroup is processed by using a migration operator to obtain a set of one part of the new execution plans, and the second subgroup is processed by using an adjustment operator to obtain a set of the other part of the new execution plans.

Finally, the execution plans obtained after processing by using the migration operator and the adjustment operator form all the new execution plans.

The migration operator can ensure that one feasible service is allocated to each task, and in addition can effectively protect relatively adequate values and perform recombination on other values.

The migration operator can use global information provided by a current optimal execution plan to guide search, and improve the diversity by introducing new services.

In an embodiment, each execution plan includes a plurality of tasks, and when the first subgroup is processed by using the migration operator to obtain the set of one part of the new execution plans, a candidate service to be allocated to each task in each new execution plan in the part is determined in the following manner: randomly selecting two execution plans from the first subgroup as first reference plans, and selecting one candidate service from candidate services corresponding to the same task in the two first reference plans according to uniform probability distribution (a uniform distribution principle) as the candidate service to be allocated to the task in the new execution plan.

Figure 3:
FIG. 3 is an example diagram of a migration operator.

For example, referring to FIG. 3, to determine new execution plans, two execution plans are randomly selected from the first subgroup as first reference plans. A candidate service with a sequence number of "132" is selected for a task $t_{11}$ in the first reference plan EPs_L1, and a candidate service with a sequence number of "876" is selected in the second first reference plan EPs_L2. It is assumed that an assessment probability is 0.5. First, a probability, that is, a generated random number, randomly generated based on the uniform distribution principle is calculated. If the calculated generated random number is less than 0.5, a result in the first reference plan EPs_L1 is inherited, or otherwise, a result in the second first reference plan EPs_L2 is inherited. If the generated random number is 0.4, because 0.4<0.5, the result in the first reference plan EPs_L1 is inherited. That is, the candidate service with the sequence number of "132" in EPs_L1 is allocated to a task $t_{11}$ in a new execution plan "New EP". Similarly, two execution plans are randomly selected from the first subgroup again, sequence numbers "1567" and "243" of services corresponding to the task $t_{12}$ are obtained, and a generated random number is calculated. If the generated random number is 0.7, because 0.7>0.5, the candidate service with the sequence number of "243" in EPs_L2 is allocated to a task $t_{12}$ in a new execution plan "New EP". By analogy, when services have been allocated to all tasks, the formulation of the new execution plans is completed.

In an embodiment, each execution plan includes a plurality of tasks, and when the second subgroup is processed by using the adjustment operator to obtain the set of the other part of the new execution plans, each new execution plan in the part is determined in the following manner:

selecting a current optimal execution plan from all execution plans (that is, all execution plans introduced by the master node) inside the parallel node, and randomly selecting one execution plan from the second subgroup as a second reference plan; and setting a primary assessment probability and a secondary assessment probability, defining a probability (that is, a generated random number) randomly generated based on a uniform distribution principle as a reference probability, and calculating the reference probability, where if the reference probability is not greater than (less than or equal to) the primary assessment probability, one candidate service is selected from candidate services corresponding to the same task in the current optimal execution plan as the candidate service to be allocated to the task in the new execution plan; if the reference probability is greater than the primary assessment probability and less than the secondary assessment probability, one candidate service is selected from candidate services corresponding to the same task in the second reference plan as the candidate service to be allocated to the task in the new execution plan; or if the reference probability is greater than or equal to the secondary assessment probability, one candidate service is randomly selected from all candidate services of a corresponding task as the candidate service to be allocated to the task in the new execution plan, thereby ensuring the diversity of solutions.

Preferably, the primary assessment probability is 0.6, and the secondary assessment probability is 0.95.

Figures 4, 5:
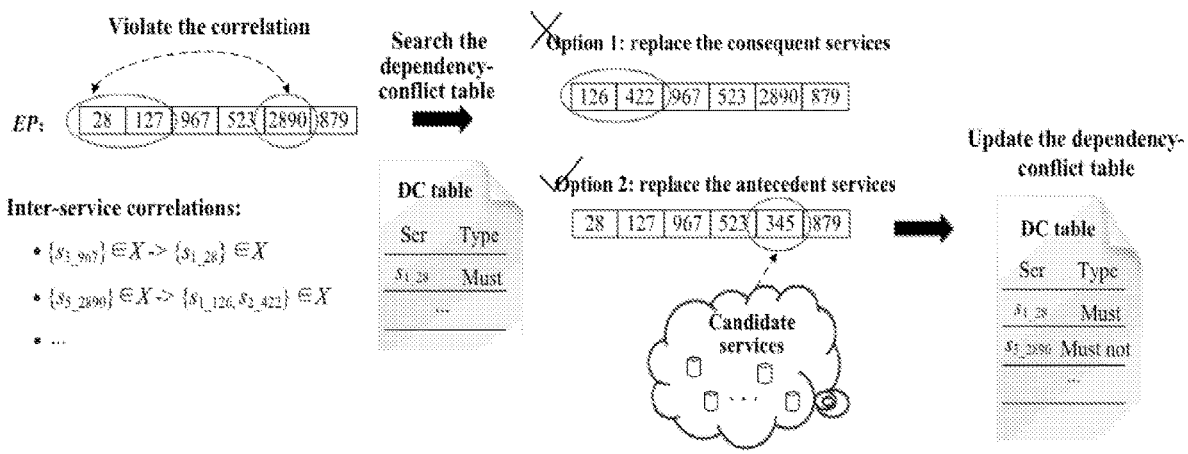
FIG. 4 is an example diagram of an adjustment operator.
FIG. 5 is an example diagram of a local replacement method when a service correlation constraint is considered.

For example, referring to FIG. 4, a current optimal execution plan "The best EP so far" is first selected from an execution plan set, and one execution plan is randomly selected from the second subgroup as a second reference plan EPs_L2. It is assumed that the primary assessment probability is 0.6, and the secondary assessment probability is 0.95. First, a probability, that is, a generated random number, randomly generated based on a uniform distribution principle is calculated. If the calculated generated random number is 0.4, because 0.4<0.6, a result in the current optimal execution plan "The best EP so far" is inherited. For example, a service "28" allocated to a task $t_{11}$ in a new execution plan in FIG. 4 is a service inherited from the current optimal execution plan. If the generated random number is 0.7, because 0.6<0.7<0.95, a result in the second reference plan EPs_L2 is inherited. For example, a service "290" allocated to a task $t_{12}$ in the new execution plan in FIG. 4 is a service inherited from the second reference plan EPs_L2. If the generated random number is 0.98, because 0.98>0.95, in this case, the results in the second reference plan EPs_L2 and the current optimal execution plan "The best EP so far" are no longer inherited in the new execution plan. Instead, a result is randomly selected from all candidate services of a corresponding task. For example, a service "609" allocated to a task $t_{16}$ in the new execution plan in FIG. 4 is randomly selected from all candidate services of the task $t_{16}$.

In an embodiment, the current optimal execution plan is an execution plan with the highest utility value in all the execution plans inside the parallel node.

Preferably: a calculation formula of the utility value is as follows:

$$\text{Utility}(X') = \begin{cases} Q(X') + 1, & \text{if } \prod_{u=1}^{|N_{QCS}|} sq_u = 1 \\ \prod_{u=1}^{|N_{QCS}|} sq_u, & \text{otherwise} \end{cases} \quad (1)$$

where $$sq_u = \begin{cases} \min\{1, Q_p(X'_{sub})_u / d_u\}, & \text{if } p \in AC \\ \min\{1, d_u / Q_p(X'_{sub})_u\}, & \text{otherwise} \end{cases} \forall u = 1, \ldots, |N_{QCS}|, \quad (2)$$

Utility (X') denotes a utility value of an execution plan X', Q(X') is an aggregated QoS value of the execution plan X', $sq_u$ denotes a degree of satisfaction of a $u^{th}$ QoS constraint, $N_{QCS}$ denotes the number of QoS constraints, $Q_p$(X sub)$_u$ denotes an aggregated QoS value of services of a $p^{th}$ attribute in the $u^{th}$ QoS constraint, X'$_{sub}$ denotes the local execution plan (an execution plan corresponding to a local process), AC denotes a set of ascending attributes, and $d_u$ denotes a boundary value of the $u^{th}$ QoS constraint.

The local execution plan is an execution plan corresponding to a local process. For example, a service process of one execution plan is formed by $t_{11}$ to $t_{19}$. The execution plan formed by $t_{11}$ to $t_{16}$ is the local execution plan.

Each QoS constraint is formed by a plurality of tasks, and a feasible region of the tasks is relatively narrow. Therefore, it is very difficult to correct an execution plan that disobeys the QoS constraint. Accordingly, the formula of the utility value is improved. The foregoing calculation formula of the utility value can ensure that in a solution seeking process, an execution plan that has a high aggregated QoS value and satisfies all QoS constraints is preferentially selected.

where $$Q(X') = \sum_{p \in AC} w_p \times \frac{Q_p(X') - Q_p^{min}}{Q_p^{max} - Q_p^{min}} + \sum_{p \in DC} w_p \times \frac{Q_p^{max} - Q_p(X')}{Q_p^{max} - Q_p^{min}}. \quad (3)$$

The foregoing function is formed by two parts. Classification is performed according to the type of a QoS attribute. The first part is used for attributes (ascending attributes) that are better when attribute values are higher, for example, reputation and a success rate. The second part is used for attributes that are better when attribute values are lower, for example, time and cost (descending attributes). $w_p$ is the weight of a $p^{th}$ QoS attribute, X' is an execution plan, and $Q_p$(X') is aggregated QoS of a $p^{th}$ attribute of the execution plan X'. $Q_p^{max}$ and $Q_p^{min}$ are maximum QoS and minimum QoS of the $p^{th}$ attribute, AC is a set of ascending attributes, and DC is a set of descending attributes.

To calculate $Q_p$(X') in Formula (3), a service process should be formalized. Due to the diversity and complexity of service requirements, a service process is usually formed by a plurality of processes with different structures. To meet these requirements, a set of service processes with a plurality of process structures are formalized in Formula (4).

$$PNS = \{\ldots, (TS_i, P_i, A_i), \ldots\} \forall i = 1, \ldots, |N_{PNS}|, A_i \subset (P_i \times TS_i) \cup (TS_i \times P_i) \quad (4).$$

PNS in the formula is a set of service processes represented by a Petri net, and $N_{PNS}$ denotes the number of service processes. For any $i^{th}$ service process, $TS_i$ is a group of abstract tasks (Transitions), $P_i$ is a group of place sets (Places), and $A_i$ is a group of directed arcs connecting the tasks and the positions.

As shown in Formula (5), aggregated QoS of each process is first calculated. Further, aggregated QoS is aggregated by using Formula (6) to obtain Q P (X').

$$Q_p(X'_i)=FI_p(Q_p(x'_{ij})|x'_{ij}\in X'_i)\forall i=1,\ldots,|N_{PNS}|, p\in AC\cup DC \quad (5),$$

$$Q_p(X')=FB_p(Q_p(X'_i)|i=1,\ldots,|N_{PNS}|)\forall p\in AC\cup DC \quad (6), \text{ and}$$

where $FI_p(\bullet)$ and $FB_p(\bullet)$ are respectively aggregation functions of a $p^{th}$ attribute in a process and between processes. $FI_p$ and $FB_p \in \{\Sigma, \Pi, MAX, MIN\}$. For example, "$\Sigma$" is used for summation, for example, for calculating a total time of two successive tasks in a process. "MAX" is used for calculating a maximum value, for example, calculating a total time of two parallel tasks in a process. "MIN" is used for calculating a minimum value, for example, calculating the reliability of two parallel tasks in a process. "$\Pi$" is used for calculating a product, for example, calculating the reliability of two successive tasks in a process. $Q_p(x'_{ij})$ is a $p^{th}$ attribute value of a task selected for a $j^{th}$ task of an lth process in an execution plan, and $X'_i$ is a set of services selected for the lth process in the execution plan.

$Q_p(X'_{sub})_u$ in Formula (2) may be calculated by using Formulas (5) and (6).

In an embodiment, a service correlation constraint includes a service dependency constraint and a service conflict constraint;
  a service with the service correlation constraint is categorized into a pre-service and a post-service;
  the service dependency constraint is defined as follows: if the post-service can be selected only after the pre-service is selected, it is defined that the service dependency constraint exists between the pre-service and the post-service;
  the service conflict constraint is defined as follows: if the post-service and the pre-service can only be selected alternatively, it is defined that the service conflict constraint exists between the pre-service and the post-service; and
  a method for repairing the obtained new execution plans by using a dependency-conflict repair algorithm to obtain repaired execution plans in step S2) includes the following step:
  examining service correlation constraints involved in the new execution plans one by one, where during each examination, it is first determined whether the service correlation constraint is valid, and if yes, a pre-service in the service correlation constraint is added with a "mandatory" label to a dependency-conflict table to represent that the pre-service must exist in an execution plan, and a next examination is performed, or if not, a current execution plan is repaired to make the repaired execution plan both satisfy a requirement of a dependency-conflict table and obey the service correlation constraint.

It may be understood that the dependency-conflict table is used for recording and storing restriction types and service sequence numbers of related services. The foregoing related services are services that must be selected or not selected for a specific task. The restriction types include two types "must" and "forbid". The restriction type of a service that must be selected for a specific task is labeled as "must", and the restriction type of a service that cannot be selected for a specific task is labeled as "forbid". Through the dependency-conflict table, it may be checked whether a repair operation for replacing some services conflicts with another service correlation constraint.

In an embodiment, during each examination, if the service correlation constraint in the current examination is invalid (that is, disobeys the service correlation constraint), the current execution plan is repaired by using the following method: first repairing the current execution plan by using a local replacement method, if the current execution plan fails to be repaired by using the local replacement method, formulating a new execution plan to globally replace the current execution plan, and after global replacement, clearing the dependency-conflict table to verify all service correlation constraints again.

In the foregoing local replacement method, some services in the current execution plan are replaced, so that an executable plan can be performed after the replacement, and no constraint conflict is caused. With the presence of a plurality of association constraints, the replacement of some services may cause other constraint conflicts. Therefore, in the foregoing local replacement method, involved service correlation constraints need to be examined one by one, and the dependency-conflict table is used to store services that must be selected or not selected for a specific task, so that during subsequent replacement of services, the dependency-conflict table is used to examine whether the replacement disobeys previous service correlation constraints. For example, a service $t_{235}$ carries a "must" label in the dependency-conflict table, indicating that the service must be present in the execution plan, or otherwise at least one service correlation constraint is disobeyed.

If a new constraint conflict always occurs after replacement using the local replacement method, in this case, an executable plan cannot be generated by using the local replacement method. In this case, a new execution plan is formulated to globally replace the current execution plan to implement repair.

In an embodiment, a service allocated in a task belonging to a pre-service in the current execution plan is defined as a first to-be-determined service, and a service allocated in a task belonging to a post-service in the current execution plan is defined as a second to-be-determined service.

If the service correlation constraint is a service dependency constraint, and a post-service in the service dependency constraint has been allocated in the current execution plan, but the first to-be-determined service is different from a pre-service in the service dependency constraint, a method for repairing the current execution plan by using a local replacement method includes: first querying whether the first to-be-determined service exists in the dependency-conflict table with the "mandatory" label, and if yes, randomly selecting, from other candidate services of the task belonging to the post-service, one candidate service without a correlation constraint to replace the post-service, and adding the post-service to the dependency-conflict table with a "forbid" label, to represent that the service is forbidden to be added to the execution plan again to ensure that the service is not added to the execution plan again during verification of subsequent association, or if not, replacing the first to-be-determined service with the pre-service.

In the foregoing of randomly selecting, from other candidate services of the task belonging to the post-service, a candidate service to replace the post-service, a candidate service without a correlation constraint needs to be selected, to avoid causing new constraint conflicts after the replacement.

For example, one service dependency constraint is described as that s5_2890 can only be invoked under the premise that s1_126 and s2_422 are invoked. That is, in this constraint, the pre-services are s1_126 and s2_422, and the post-service is s5_2890. As can be known from FIG. 5, through the examination of service correlation constraints, it can be seen that the second association constraint is disobeyed. The post-service allocated in the execution plan is s5_2890. However, there is no corresponding pre-service. Services allocated in a task belonging to a pre-service in the current execution plan are s1_28 and s2_127. That is, the first to-be-determined services are s1_28 and s2_127. To make the execution plan feasible, it is intended to use s1_126 and s2_422 required by association to replace s1_28 and s2_127 in the current execution plan. Therefore, it needs to be determined whether the first to-be-determined services s1_28 and s2_127 exist in the dependency-conflict table. However, the service s1_28 selected in the current execution plan has a "must" type in the dependency-conflict table, it indicates that the service cannot be replaced (the first association constraint is disobeyed if the service is replaced). Because a determination result is no, s5_345 without a correlation constraint is randomly selected from candidate services of a task $t_5$ to which the post-service s5_2890 belongs to replace s5_2890 in the current plan. In addition, the service s5_2890 is added to the dependency-conflict table and is labeled as a "forbid" type, to ensure that during verification of subsequent association, the service is not added to the execution plan again.

If the service correlation constraint is a service dependency constraint, and a pre-service in the service dependency constraint has been allocated in the current execution plan, but the second to-be-determined service is different from a post-service in the service dependency constraint, a method for repairing the current execution plan by using a local replacement method includes: first querying whether the second to-be-determined service exists in the dependency-conflict table with the "mandatory" label, and if yes, randomly selecting, from other candidate services of the task belonging to the pre-service, one candidate service with a correlation constraint to replace the pre-service, and adding the pre-service to the dependency-conflict table with a "forbid" label, or if not, replacing the second to-be-determined service with the post-service.

If the service correlation constraint is a service conflict constraint, a post-service in the service conflict constraint has been allocated in the current execution plan, and the first to-be-determined service is the same as a pre-service in the service conflict constraint, a method for repairing the current execution plan by using a local replacement method includes: first querying whether the first to-be-determined service exists in the dependency-conflict table with the "mandatory" label, and if yes, randomly selecting, from other candidate services of the task belonging to the post-service, one candidate service without a correlation constraint to replace the post-service, and adding the post-service to the dependency-conflict table with a "forbid" label, or if not, randomly selecting, from other candidate services of the task belonging to the pre-service, one candidate service without a correlation constraint to replace the pre-service, and adding the pre-service to the dependency-conflict table with a "forbid" label.

In the foregoing process of repairing the current execution plan by using a local replacement method, once the constraint is satisfied, the related service is recorded in the dependency-conflict table. Next, a next association constraint continues to be examined. Once the association constraint is disobeyed, a repair process is run to perform repair to ensure that the repaired execution plan is feasible.

In consideration of that a lot of iterative computation is required in the optimization algorithm for large-scale cloud service processes, a memory computation-based Spark parallel computing framework is selected to perform algorithm verification on the optimization method for cloud service processes in this embodiment. A process of the verification is as follows:

The scale of an optimization problem for large-scale cloud service processes depends on the number of service processes, the number of abstract tasks, and the number of candidate services. To verify the effectiveness of algorithms, three groups of experiments with different problem scales are established. Each group of experiments are randomly generated according to Table 1.

TABLE 1

| Experimental settings | |
|---|---|
| Problem scenario | Description |
| Service process | Service processes with different structures are generated with reference to related literature. A task type is randomly selected from a set {'sequence', flow, 'switch', 'while'}, and a specific number of tasks are inserted. |
| Service | Each service is randomly generated. Each service includes five typical QoS attributes {time, cost, reputation, success rate, and availability}. Default QoS values of the five QoS attributes are respectively randomly generated within value ranges [1, 10], [1, 10], [1, 10], [0.9, 1], and [0.9, 1]. The weights of the attributes are respectively 0.4, 0.3, 0.1, 0.1, and 0.1. |
| QOS constraint | For each QoS constraint, one QoS attribute and a subprocess included in the QoS attribute are first randomly selected. Next, a threshold d is randomly generated between a maximum QoS value and a minimum QoS value of the subprocess. |
| Service correlation constraint | For each QoS dependency constraint, based on aggregated QOS, a plurality of services are randomly selected, and discounts of the plurality of services are defined. In addition, dependency and conflict constraints between services are generated by randomly selecting a group of pre-services and post-services. |

The foregoing optimization method for large-scale cloud service processes of the present application is denoted as a PMAQI algorithm. The PMAQI algorithm in this embodiment is compared with three existing optimization methods: a Double Information-based Cooperative Co-evolutionary algorithm (DICC), an ESWOA, and Map Reduce-based Evolutionary Algorithm with Guided mutation (MR-EA/G). The DICC and the ESWOA are both serial optimization methods, and MR-EA/G is a parallel optimization method.

A cluster environment is built based on Docker and Spark. The environment includes one master node and four parallel nodes. One executor is run on each parallel node. The hardware environment is Huawei's Elastic Cloud server configured with 8 vCPUs and 64-GB memory. Certainly, the algorithm may be run in distributed computers. In consideration of that a serial contrast algorithm is included in the experiments, the use of the environment facilitates the verification of the comparison of algorithm performance in the same hardware environment.

The population scale is set to 300, and the number of iterations maxGen=500. Parameters in the method are as follows: The maximum local number of unimproved times unImp=5, and the maximum local number of iterations=10. In each experiment, each of the number of QoS constraints and the number of service correlation constraints is set to 20. Because a service correlation constraint is not considered in the contrast algorithm, the dependency-conflict repair algorithm provided in the patent is used to avoid disobeying the service correlation constraint. For each experiment, the algorithms run 20 times, utility values of Formula (1) are used to evaluate the effectiveness of algorithms, and an average computation time is calculated to evaluate the efficiency of the algorithms.

Figure 6:
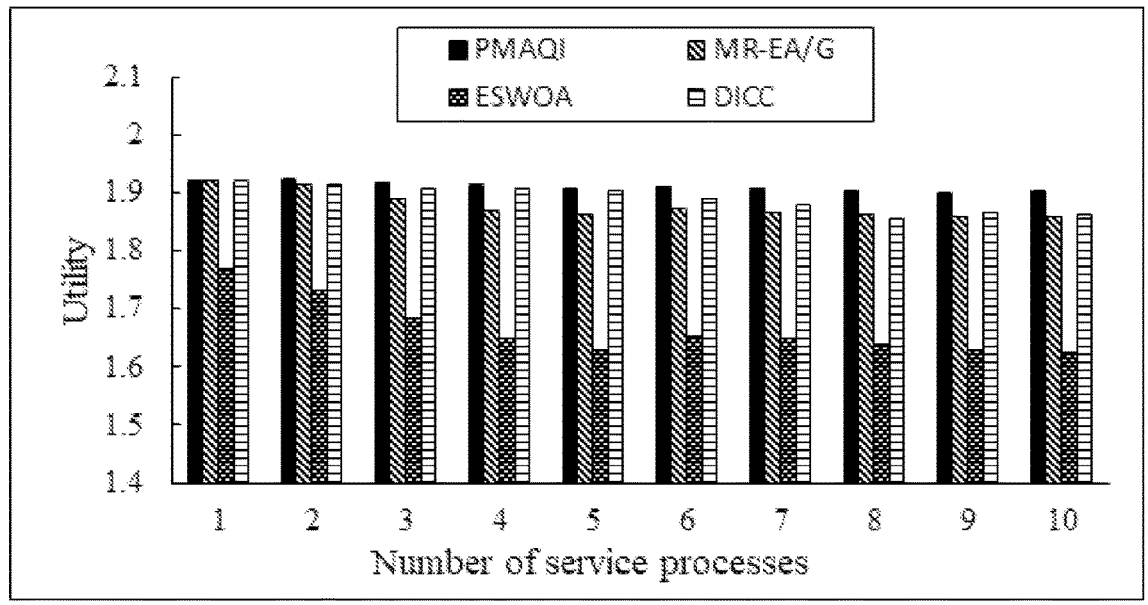
FIG. 6 is a comparison diagram of utility values of different optimization methods with different numbers of service processes in a first group of experiments.
Figure 7:
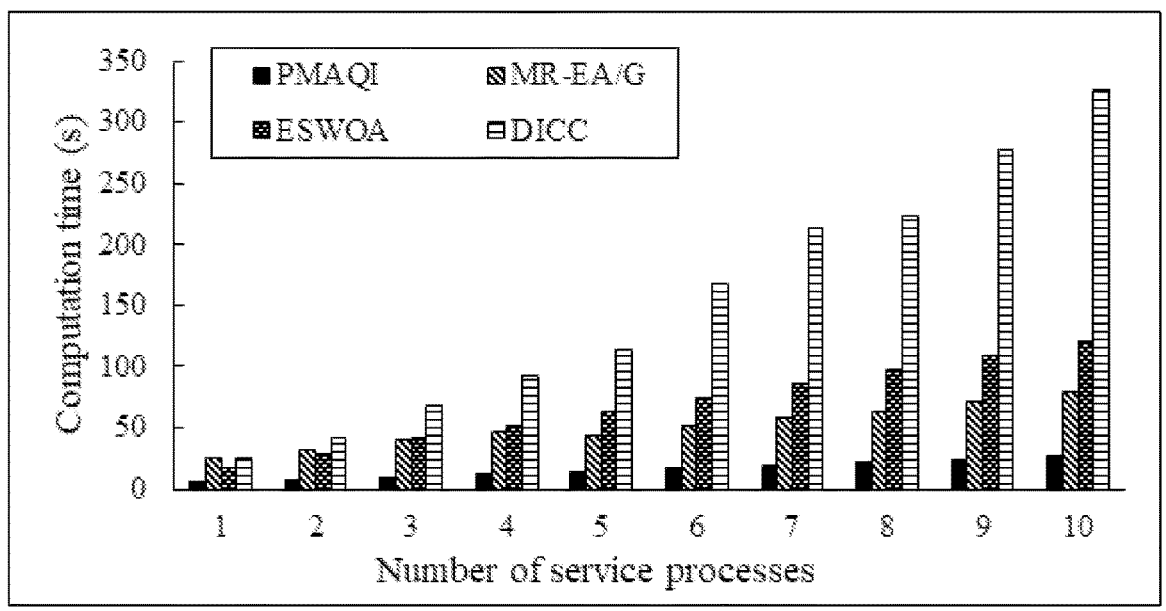
FIG. 7 is a comparison diagram of computation time of different optimization methods with different numbers of service processes in the first group of experiments.

First group of experiments: In experiments with different numbers of service processes, the number of service processes ranges from 1 to 10. Each process is formed by 20 abstract tasks, and each abstract task has 5000 services. Therefore, every experiment has $5000^{20\text{n}}$ ($n$=1 to 10) potential execution plans. The experimental results are shown in FIG. 6 and FIG. 7. The horizontal coordinate "Number of service processes" in the figures represents different numbers of service processes, the vertical coordinate "Utility" represents a utility value, and the vertical coordinate "Computation time" represents a computation time.

FIG. 6 shows utility values in different numbers of service processes. As can be known from FIG. 6, the PMAQI algorithm in the present application can obtain the highest utility value in each experiment. MR-EA/G and DICC obtain similar utility values, slightly less than the utility value of the PMAQI algorithm. The utility value of ESWOA is the lowest and is much less than the utility values of other algorithms. The first experiment is used as an example. The utility value of the best execution plan of PMAQI is 1.921. This means that the aggregated QoS value obtained through Formula (3) is 0.921, and satisfies all QoS constraints and relationships between services. In comparison, the utility values of the best solutions obtained through MR-EA/G, ESWOA, and DICC are respectively 1.921, 1.768, and 1.920. In addition, as the number of service processes increases, the PMAQI algorithm keeps adequate search performance. The algorithm accuracy increase rate of the PMAQI algorithm ranges from 0 to 17.17%. The algorithm accuracy increase rate=(the utility value of the PMAQI algorithm—the utility value of a contrast algorithm)/the utility value of the contrast algorithm.

FIG. 7 shows a computation time of each algorithm in each experiment. As can be known from FIG. 7, as the number of service processes increases, the computation time of the algorithm also increases. The first experiment is used as an example. The computation time of the PMAQI algorithm of the present application is 6.50 s. The computation time of MR-EA/G is 25.84 s, the computation time of ESWOA is 17.35 s, and the computation time of DICC is 26.01 s. The PMAQI algorithm in the present application consumes the shortest computation time in each experiment. MR-EA/G and ESWOA respectively rank second and third. DICC takes the longest computation time. In addition, as the number of service processes increases, the computation time increase rates of the serial algorithms ESWOA and DICC are much higher than those of parallel algorithms PMAQI and MR-EA/G. Compared with other algorithms, the PMAQI algorithm in the present application has increased the efficiency by 62.52% to 91.67%. The efficiency increase=(the computation time of a contrast algorithm—the computation time of the PMAQI algorithm)/the computation time of the contrast algorithm.

Figure 8:
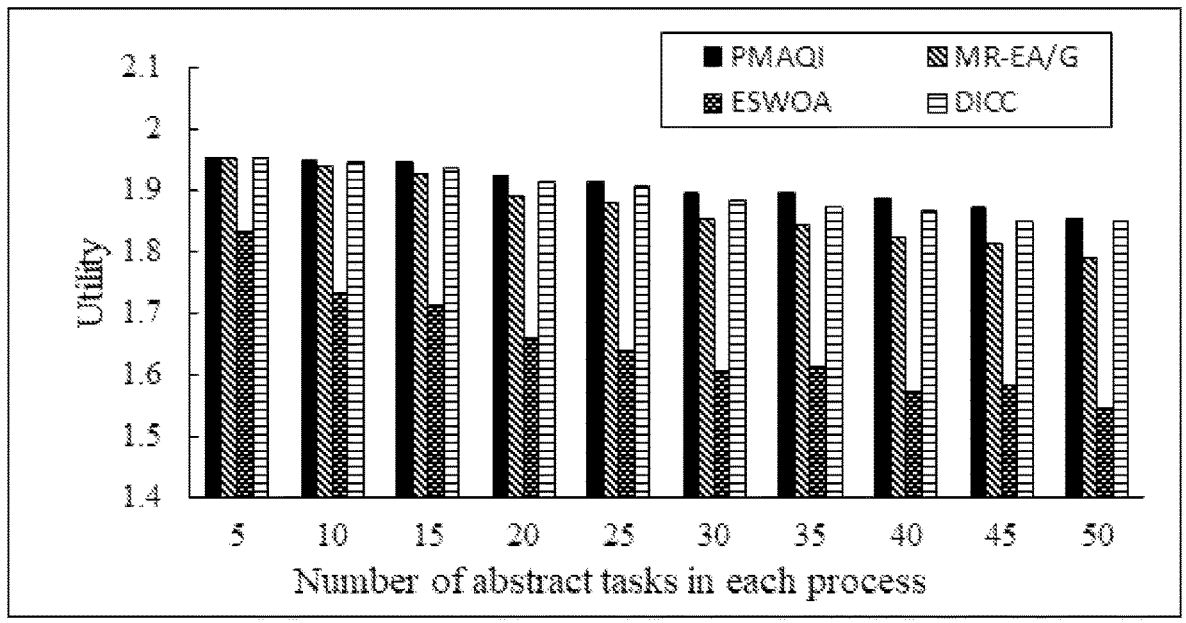
FIG. 8 is a comparison diagram of utility values of different optimization methods with different numbers of abstract tasks in a second group of experiments.
Figure 9:
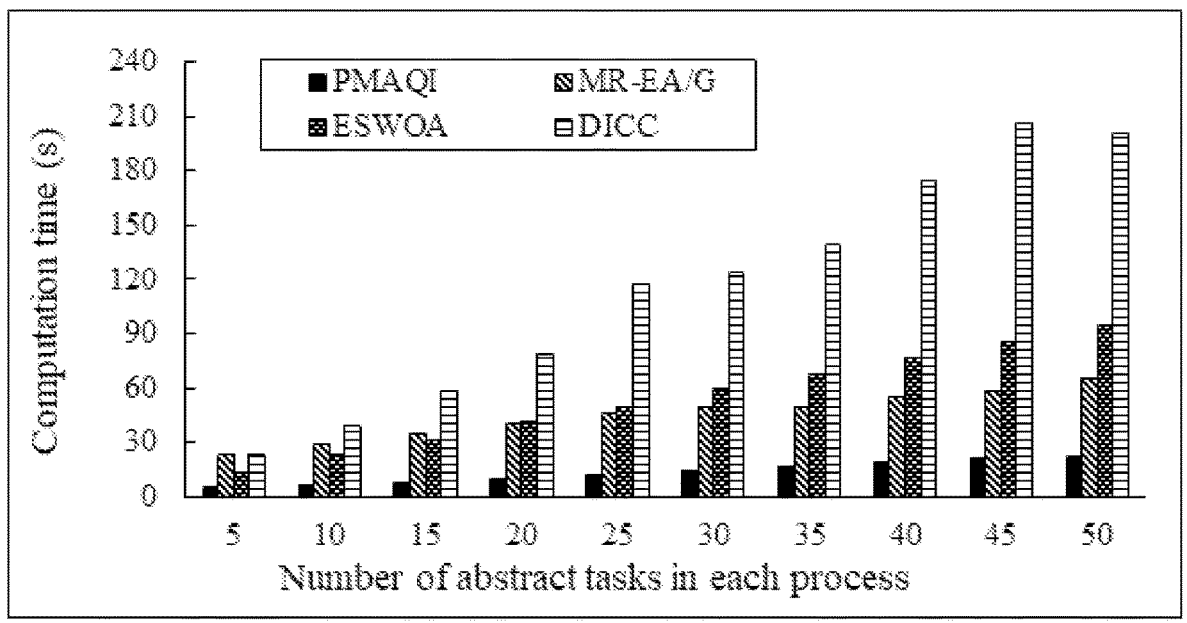
FIG. 9 is a comparison diagram of computation time of different optimization methods with different numbers of abstract tasks in the second group of experiments.

Second group of experiments: In experiments with different numbers of abstract tasks, the number of abstract tasks in each service process ranges from 5 to 50. The number of service processes is 3. The number of service processes of each abstract task is 7000. Therefore, every experiment has $7000^{3\text{n}}$ ($n$=5 to 50) potential execution plans. The experimental results are shown in FIG. 8 and FIG. 9. The horizontal coordinate "Number of abstract tasks in each process" in the figures represents different numbers of abstract tasks in each service process, the vertical coordinate "Utility" represents a utility value, and the vertical coordinate "Computation time" represents a computation time.

FIG. 8 shows utility values in different numbers of abstract tasks in each service process. As can be known from FIG. 8, the PMAQI algorithm in the present application can obtain the highest utility value in each experiment. The utility values of DICC, MR-EA/G, and ESWOA respectively rank second, third, and fourth. Although the computational complexity increases as the number of abstract tasks increases, the PMAQI algorithm of the present application can keep adequate search performance. The algorithm accuracy increase rate ranges from 0 to 19.88%.

FIG. 9 shows computation time in different numbers of abstract tasks in each service process. As can be known from FIG. 9, as the number of abstract tasks increases, the computation time of each algorithm also increases. The PMAQI algorithm in the present application may obtain the shortest computation time in each experiment, and as the number of abstract tasks increases, the time increase rate of the PMAQI algorithm is also the lowest. The computation time of MR-EA/G and the computation time of ESWOA are longer than the computation time of the PMAQI algorithm, and respectively rank second and third. The computation time of DICC is the longest, and is much longer than the computation time of other algorithms. Compared with other algorithms, the PMAQI algorithm in the present application has increased the efficiency by 55.69% to 89.96%.

Figure 10:
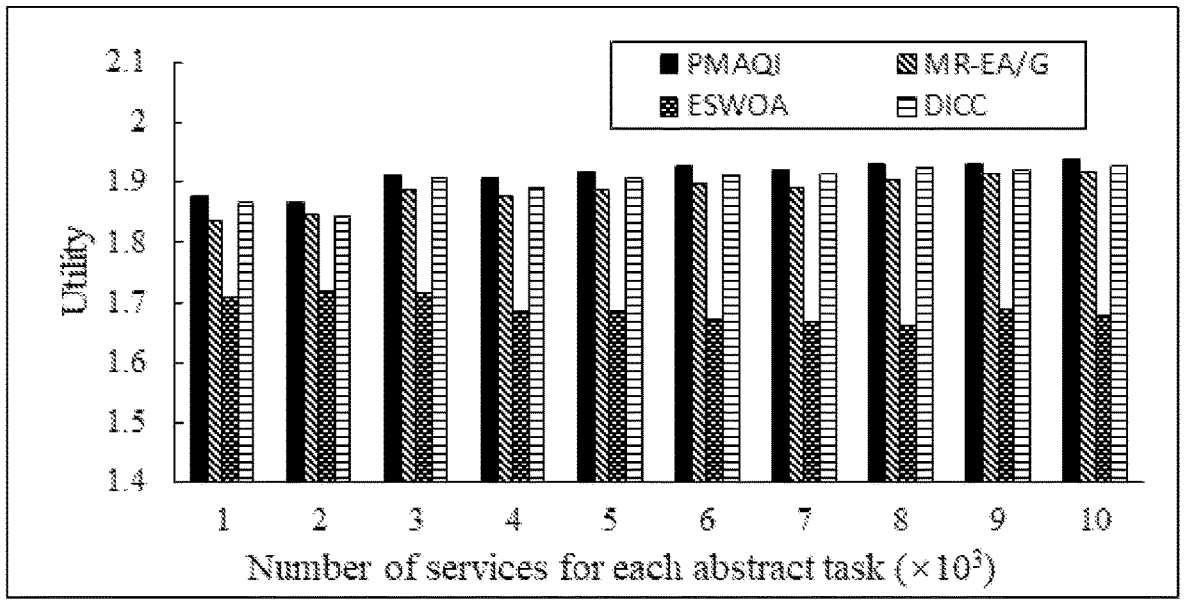
FIG. 10 is a comparison diagram of utility values of different optimization methods with different numbers of services in a third group of experiments.
Figure 11:
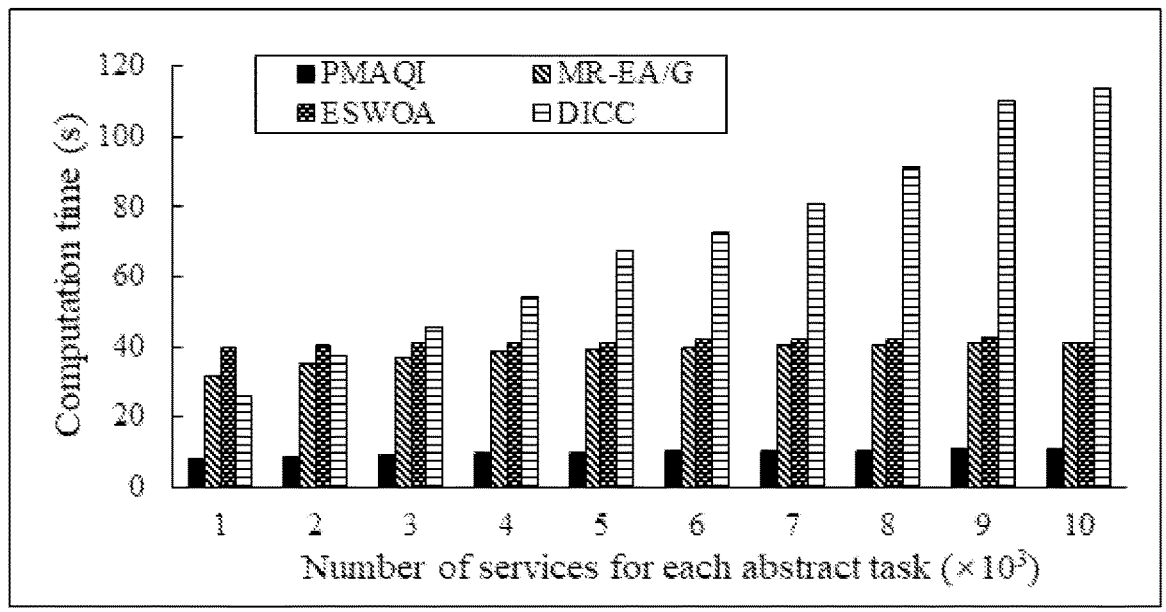
FIG. 11 is a comparison diagram of computation time of different optimization methods with different numbers of services in the third group of experiments.

Third group of experiments: In experiments with different numbers of services, the number of services of each abstract task ranges from 1000 to 10000. For three service processes, each process is formed by 20 abstract tasks. Therefore, $n^{60}$ ($n$=1000 to 10000) potential execution plans exist in every experiment. The experimental results are shown in FIG. 10 and FIG. 11. The horizontal coordinate "Number of services for each abstract task" in the figures represents different numbers of services in each abstract task, the vertical coordinate "Utility" represents a utility value, and the vertical coordinate "Computation time" represents a computation time.

FIG. 10 shows utility values in different numbers of services. As can be known from FIG. 10, the PMAQI algorithm in the present application can obtain the highest utility value in each experiment. The utility values of MR-EA/G and ESWOA are slightly less than the utility value of the PMAQI algorithm, and respectively rank second and third. The utility value of ESWOA is less than the utility values of the other three algorithms. Compared with the other algorithms, the algorithm accuracy increase rate of the PMAQI algorithm is 0.21% to 16.18%.

FIG. 11 shows computation time in different numbers of services. As can be known from FIG. 11, as the number of candidate services increases, the computation time of each algorithm also increases. The time increase rate of the ESWOA algorithm is the lowest. The time increases rates of the PMAQI algorithm of the present application and the MR-EA/G are slightly higher, and respectively rank second and third. DICC has the highest time increase rate. The PMAQI algorithm can obtain the shortest computation time in all the experiments. Compared with the other algorithms, the increase rate of the PMAQI algorithm in efficiency is 68.81% to 90.30%.

As can be seen from the foregoing experimental results, the PMAQI algorithm of the present application has obtained the largest utility value and consumed the shortest computation time in all experiments. The utility value and the computation time of MR-EA/G are slightly less than those of the PMAQI algorithm, and the comprehensive performance of MR-EA/G ranks second. The computation time of the ESWOA algorithm ranks third, but the utility value of the ESWOA algorithm is much less than the utility values of the other algorithms. In comparison, the utility value of DICC is slightly less than the PMAQI algorithm, but the computation time of DICC is much longer than the computation time of other algorithms. The reasons of the foregoing phenomenon are analyzed as follows: In the PMAQI algorithm of the present application, the search complexity is reduced by using the DMBO algorithm, and the effectiveness of solution seeking is improved by using the dependency-conflict repair algorithm. In addition, a local iteration-based parallel computing model effectively improves the efficiency of parallel search. In comparison, MR-EA/G uses a classic service discovery method to improve the search efficiency, but has a relatively long computation time. In addition, local iterations are not considered in MR-EA/G, but operations such as subpopulation and exchange exist in each iteration process. Therefore, MR-EA/G requires a longer computation time than the PMAQI algorithm. ESWOA mainly depends on an evolution strategy not related to problems to guide search, and the computation effect is not ensured. DICC may use pheromone to guide search in a cooperative co-evolutionary framework to keep adequate search accuracy. However, the calculation of the pheromone of each service is required in DICC, and the computational complexity is very high.

In the optimization method for large-scale cloud service processes in this embodiment, a parallel technology roadmap is used. That is, a problem is decomposed into a plurality of subtasks to be run in parallel nodes, and the method can be implemented based on various existing parallel technologies. Through the design of algorithms such as the DMBO algorithm and the dependency-conflict repair algorithm, the method is applicable to optimization problems for large-scale cloud service processes with different service process structures, QoS constraints, and service correlation constraints, and the accuracy and efficiency of solution seeking are ensured. In addition, the designed local iteration-based parallel model can utilize parallel computing resources in a balanced manner, and reduce communication overheads, thereby quickly and effectively find an optimal execution plan.

A person skilled in the art should understand that the embodiments of the present application may be provided as a method, a system or a computer program product. Therefore, the present application may use a form of hardware only embodiments, software only embodiments, or embodiments with a combination of software and hardware. Moreover, the present application may use a form of a computer program product that is implemented on one or more computer-usable storage media (including but not limited to a disk memory, a CD-ROM, an optical memory, and the like) that include computer usable program code.

The present application is described with reference to the flowcharts and/or block diagrams of the method, the device (system), and the computer program product according to the embodiments of the present application. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a dedicated computer, an embedded processor, or a processor of any other programmable data processing device to generate a machine, so that the instructions executed by a computer or a processor of any other programmable data processing device generate an apparatus for implementing a specific function in one or more processes in the flowcharts and/or in one or more blocks in the block diagrams.

These computer program instructions may be stored in a computer readable memory that can instruct the computer or any other programmable data processing device to work in a specific manner, so that the instructions stored in the computer readable memory generate an artifact that includes an instruction apparatus. The instruction apparatus implements a specific function in one or more processes in the flowcharts and/or in one or more blocks in the block diagrams.

These computer program instructions may be loaded onto a computer or another programmable data processing device, so that a series of operations and steps are performed on the computer or the another programmable device, thereby generating computer-implemented processing. Therefore, the instructions executed on the computer or the another programmable device provide steps for implementing a specific function in one or more processes in the flowcharts and/or in one or more blocks in the block diagrams.

Obviously, the foregoing embodiments are merely examples for clear description, rather than a limitation to implementations. For a person of ordinary skill in the art, other changes or variations in different forms may also be made based on the foregoing description. All implementations cannot and do not need to be exhaustively listed herein. Obvious changes or variations that are derived there from still fall within the protection scope of the invention of the present invention.

What is claimed is:

1. An optimization method for large-scale cloud service processes, comprising steps of:
    S1) randomly allocating a plurality of execution plans to a plurality of parallel nodes, to allow each parallel node to be allocated with a subset of the plurality of execution plans;
    S2) performing, by each parallel node, a local iteration in parallel to process the execution plans inside the parallel node, wherein
    during each local iteration, the parallel node first processes the execution plans inside the parallel node by using a discrete monarch butterfly optimization (DMBO) algorithm to obtain new execution plans, then repairs the new execution plans by using a dependency-conflict repair algorithm to obtain repaired execution plans, then evaluates the repaired execution plans by using a utility function, and filters the repaired execution plans according to evaluation results;
    S3) gathering together the filtered, repaired execution plans obtained after the local iterations in all the parallel nodes are completed;
    S4) determining whether a global iteration stop condition is satisfied, wherein if yes, the execution plans obtained in step S3) are final optimal execution plans, and the final optimal execution plans are directly outputted, or if not, step S5) is performed; and
    S5) reallocating the gathered execution plans obtained in step S3) to the plurality of parallel nodes, and then performing steps S2) to S4) again,
    wherein
    a service correlation constraint comprises a service dependency constraint and a service conflict constraint;
    a service with the service correlation constraints categorized into a pre-service and a post-service;

the service dependency constraint is defined as: the post-service is selected only after the pre-service is selected, and the service dependency constraint exists between the pre-service and the post-service;

the service conflict constraint is defined as: the post-service and the pre-service are only selected alternatively, and the service conflict constraint exists between the pre-service and the post-service; and a method for repairing the obtained new execution plans by using a dependency-conflict repair algorithm to obtain repaired execution plans in step S2) comprises:

examining service correlation constraints involved in the new execution plans one by one, wherein during each examination, it is first determined whether the service correlation constraint is valid, and if yes, a pre-service in the service correlation constraint is added with a "mandatory" label to a dependency-conflict table to represent that the pre-service must exist in an execution plan, and a next examination is performed, or if not, a current execution plan is repaired to make the repaired execution plan both satisfy a requirement of the dependency-conflict table and obey the service correlation constraint; and wherein during each examination, the service correlation constraint in the current examination is invalid, and the current execution plan is repaired by a step of: repairing the current execution plan by using a local replacement method.

2. The optimization method for large-scale cloud service processes according to claim 1, wherein a method for processing the execution plans inside the parallel node by using a DMBO algorithm to obtain new execution plans in step S2) comprises:

dividing the subset of the plurality of execution plans inside the parallel node into two parts, defining one part as a first subgroup, and defining the other part as a second subgroup; and processing the first subgroup by using a migration operator to obtain a set of one part of the new execution plans, and processing the second subgroup by using an adjustment operator to obtain a set of the other part of the new execution plans.

3. The optimization method for large-scale cloud service processes according to claim 2, wherein each execution plan comprises a plurality of tasks, and when the first sub group is processed by using the migration operator to obtain the set of one part of the new execution plans, a candidate service to be allocated to each task in each new execution plan in the part is determined in the following manner: randomly selecting two execution plans from the first subgroup as first reference plans, and selecting one candidate service from candidate services corresponding to the same task in the two first reference plans as the candidate service to be allocated to the task in the new execution plan.

4. The optimization method for large-scale cloud service processes according to claim 2, wherein each execution plan comprises a plurality of tasks, and when the second subgroup is processed by using the adjustment operator to obtain the set of the other part of the new execution plans, each new execution plan in the part is determined in the following manner:

selecting a current optimal execution plan from all execution plans inside the parallel node, and randomly selecting one execution plan from the second subgroup as a second reference plan; and setting a primary assessment probability and a secondary assessment probability, defining a probability randomly generated based on a uniform distribution principle as a reference probability, and calculating the reference probability, wherein if the reference probability is not greater than the primary assessment probability, one candidate service is selected from candidate services corresponding to the same task in the current optimal execution plan as the candidate service to be allocated to the task in the new execution plan; if the reference probability is greater than the primary assessment probability and less than the secondary assessment probability, one candidate service is selected from candidate services corresponding to the same task in the second reference plan as the candidate service to be allocated to the task in the new execution plan; or if the reference probability is greater than or equal to the secondary assessment probability, one candidate service is randomly selected from all candidate services of a corresponding task as the candidate service to be allocated to the task in the new execution plan.

5. The optimization method for large-scale cloud service processes according to claim 4, wherein the current optimal execution plan is an execution plan with the highest utility value in all the execution plans inside the parallel node.

6. The optimization method for large-scale cloud service processes according to claim 5, wherein the utility value is calculated by:

$$\text{Utility}(X') = \begin{cases} Q(X') + 1, & \text{if } \prod_{u=1}^{|N_{QCS}|} sq_u = 1 \\ \prod_{u=1}^{|N_{QCS}|} sq_u, & \text{otherwise} \end{cases},$$

where $$sq_u = \begin{cases} \min\{1, Q_p(X'_{sub})_u / d_u\}, & \text{if } p \in AC \\ \min\{1, d_u / Q_p(X'_{sub})_u\}, & \text{otherwise} \end{cases} \forall u = 1, \ldots, |N_{QCS}|,$$

Utility (X') denotes a utility value of an execution plan X', Q(X') is an aggregated quality of service (QOS) value of the execution plan X', $sq_u$ denotes a degree of satisfaction of a $u^{th}$ QoS constraint, $N_{QCS}$ denotes the number of QOS constraints, $Q_p(X'_{sub})_u$ denotes an aggregated QoS value of a local execution plan of a $p^{th}$ attribute in the $u^{th}$ QoS constraint, $X'_{sub}$ denotes the local execution plan, AC denotes a set of ascending attributes, and $d_u$ denotes a boundary value of the $u^{th}$ QoS constraint.

7. The optimization method for large-scale cloud service processes according to claim 1, wherein a service allocated to a task belonging to a pre-service in the current execution plan is defined as a first to-be-determined service, and a service allocated to a task belonging to a post-service in the current execution plan is defined as a second to-be-determined service, wherein the service correlation constraint is a service dependency constraint, and a post-service in the service dependency constraint has been allocated in the current execution plan, but the first to-be-determined service is different from a pre-service in the service dependency constraint, a method for repairing the current execution plan by using a local replacement method comprises: first querying whether the first to-be-determined service exists in the dependency-conflict table with the "mandatory" label, and if yes, randomly selecting, from other candidate services of the task belonging to the post-service, one candidate service without a service correlation constraint to replace the post-service, and adding the post-service to the dependency-conflict table with a "forbid" label, or if not, replacing the first to-be-determined service with the pre-service; or the service correlation constraint is a service dependency constraint, and a pre-service in the service dependency constraint has been allocated in the current execution plan, but the second to-be-determined service is different from a post-service in the service dependency constraint, a method for repairing the current execution plan by using a local replacement method comprises: first querying whether the second to-be-determined service exists in the dependency-conflict table with the "mandatory" label, and if yes, randomly selecting, from other candidate services of the task belonging to the pre-service, one candidate service with a service correlation constraint to replace the pre-service, and adding the pre-service to the dependency-conflict table with a "forbid" label, or if not, replacing the second to-be-determined service with the post-service; or the service correlation constraint is a service conflict constraint, a post-service in the service conflict constraint has been allocated in the current execution plan, and the first to-be-determined service is the same as a pre-service in the service conflict constraint, a method for repairing the current execution plan by using a local replacement method comprises: first querying whether the first to-be-determined service exists in the dependency-conflict table with the "mandatory" label, and if yes, randomly selecting, from other candidate services of the task belonging to the post-service, one candidate service without a service correlation constraint to replace the post-service, and adding the post-service to the dependency-conflict table with a "forbid" label, or if not, randomly selecting, from other candidate services of the task belonging to the pre-service, one candidate service without a service correlation constraint to replace the pre-service, and adding the pre-service to the dependency-conflict table with a "forbid" label.

* * * * *